United States Patent

Proshan

[11] Patent Number: 5,813,755
[45] Date of Patent: Sep. 29, 1998

[54] SINGLE BLADE WHISK

[76] Inventor: Mary-Elizabeth Proshan, 301 N. Harrison St., Princeton, N.J. 08540

[21] Appl. No.: 757,006

[22] Filed: Nov. 25, 1996

[51] Int. Cl.$^6$ ..................................................... A47J 43/10
[52] U.S. Cl. ......................................... 366/129; 416/70 R
[58] Field of Search ..................................... 366/129, 130, 366/342–344; 416/69, 70 R, 227 R, 231 R, 231 A, 231 B, 235; 15/141.1, 141.2; 99/348; D7/376–380, 412, 688, 690

[56] References Cited

U.S. PATENT DOCUMENTS

| 230,314 | 7/1880 | McManus | 416/231 X |
| 300,915 | 6/1884 | Stanton | 416/70 |
| 408,482 | 8/1889 | Hicks | 416/235 X |
| 1,038,469 | 9/1912 | Wood | 366/343 X |
| 1,460,007 | 6/1923 | Williams | 416/70 |
| 1,969,162 | 8/1934 | Smith | 366/343 X |
| 2,575,978 | 11/1951 | Scheidecker | 366/129 X |

FOREIGN PATENT DOCUMENTS

| 911833 | 7/1946 | France | 416/70 |
| 936947 | 8/1948 | France | 416/70 |
| 1388968 | 12/1965 | France | 416/70 |

Primary Examiner—Charles E. Cooley

[57] ABSTRACT

A flat, thin, somewhat flexible elongated member has a longitudinally extending centrally disposed axis of symmetry and upper and lower opposite ends. The lower end is flat, relatively long and disposed at right angles to the axis of symmetry and defines a horizontal extension disposed in a horizontal plane at right angles to the axis of symmetry. The upper end is relatively short and extends longitudinally from a common position on the member which is located between the upper and lower ends. The member has opposite sides of like convex curvature which extend outwardly and downwardly from opposite ends of each horizontal extension to the common position.

3 Claims, 2 Drawing Sheets

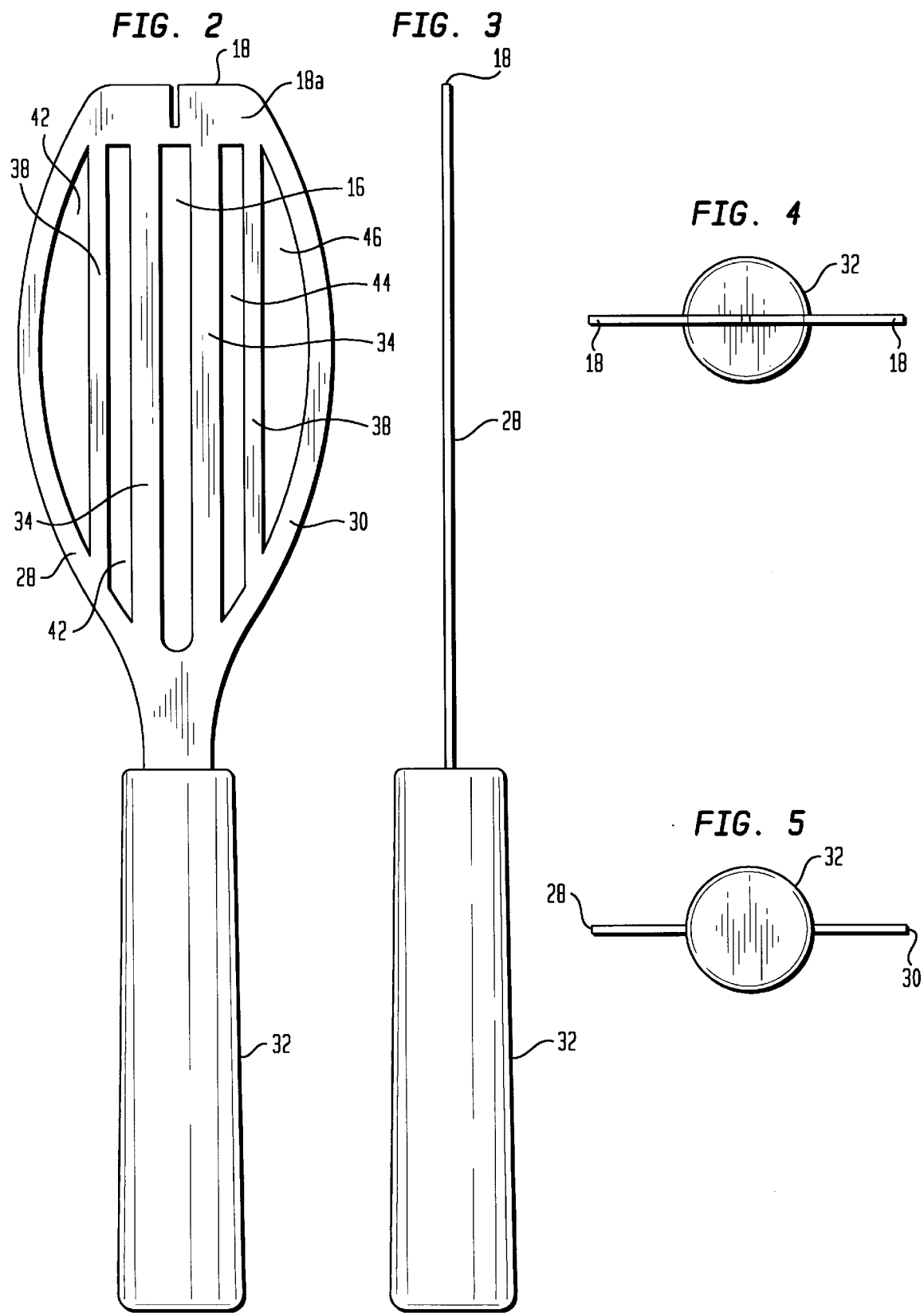

SINGLE BLADE WHISK

CROSS REFERENCE TO COPENDING APPLICATIONS

This application is related to three other copending applications filed on the same date hereof. These applications are: Multiblade Whisks Ser. No. 08/757,007, Design of Multiblade Whisk, Ser. No. 29/063,066, and Design of Single Blade Whisk, Ser. No. 29/063,065.

BACKGROUND OF THE INVENTION

It often becomes necessary to heat and stir roux and similar sauces without burning them. These sauces are normally prepared in sauce pans having flat bottom surfaces and curved walls wherein the sauces cover the entire surface area and also the lowest portion of the curved walls. In order to properly prepare such sauces, both the temperature and time of cooking is critical and the sauce must be completely and rapidly stirred. Known types of whisks employ wire loops having a round or oval shape and can be used efficiently in many different applications. However, such whisks are not suitable for stirring such sauces because the loops only engage the surface of the sauce pan at discrete points and are spaced from the walls whereby at least portions of the sauce can burn during stirring.

The present invention is directed toward a new type of whisk which can be used to provide proper stirring of roux and other sauces during preparation and eliminate the risk of burning and the like.

SUMMARY OF THE INVENTION

Accordingly, it is an object of the present invention to provide a new and improved whisk which engages large areas of the surface of the sauce pan and by manual operation can engage the entire area of the surface as well as the appropriate portions of the walls in such manner as to provide proper stirring of roux and other sauces.

Another object is to provide a new and improved whisk having a unique geometry which permits it to engage large surface areas and walls of sauce pans and the like without abrading or scratching such surfaces and walls.

Still another object is to provide a new and improved whisk having a horizontal and flat lower end surface for engaging large surface areas of sauce pans and the like and at the same time having curved vertical surfaces for engaging the walls of such pans.

These and other objects and advantages of this invention will either be explained or will become apparent hereinafter.

In accordance with the principles of this invention, the whisk employs a flat, thin, somewhat flexible elongated member having a longitudinally extending centrally disposed axis of symmetry. The member has first and second opposite ends.

The first and lower end is flat, relatively long and disposed at right angles to the axes of symmetry and defines a horizontal extension. The second and upper end is relatively short and extends longitudinally from a common position located between its first and second ends. The member has opposite sides of like convex curvature which extend outwardly and downwardly from opposite ends of its horizontal extension to the common position.

The axis of symmetry is defined by a longitudinally extending centrally disposed slot which extends from the first extension to the common position.

A handle is secured to the upper end of the member.

In use, the lower end of the members can engage a large surface area of a sauce pan while the curved sides of the member can engage the walls of the pan. The handle is removably disposed in an electrical appliance such as an electric mixer and is rotated and moved as desired to produce the desired stirring action. This single member unit is not adapted for manual operation because it is not easily rotated manually for proper use. The copending application entitled Multiblade Whisk discloses a multimember easily rotated manually for proper use.

The entire whisk is constructed of plastic so that there is no scratching or abrading of engaged surfaces and walls during use.

BRIEF DESCRIPTIONS OF THE DRAWINGS

FIG. 2 is a plan view of the structure of FIG. 1.

FIG. 3 is a side view of the structure shown in FIG. 1.

FIG. 4 is a top view of the structure shown in FIG. 1.

FIG. 5 is a bottom view of the structure shown in FIG. 1.

DETAILED DESCRIPTION OF PREFERRED EMBODIMENT

Figure 1:
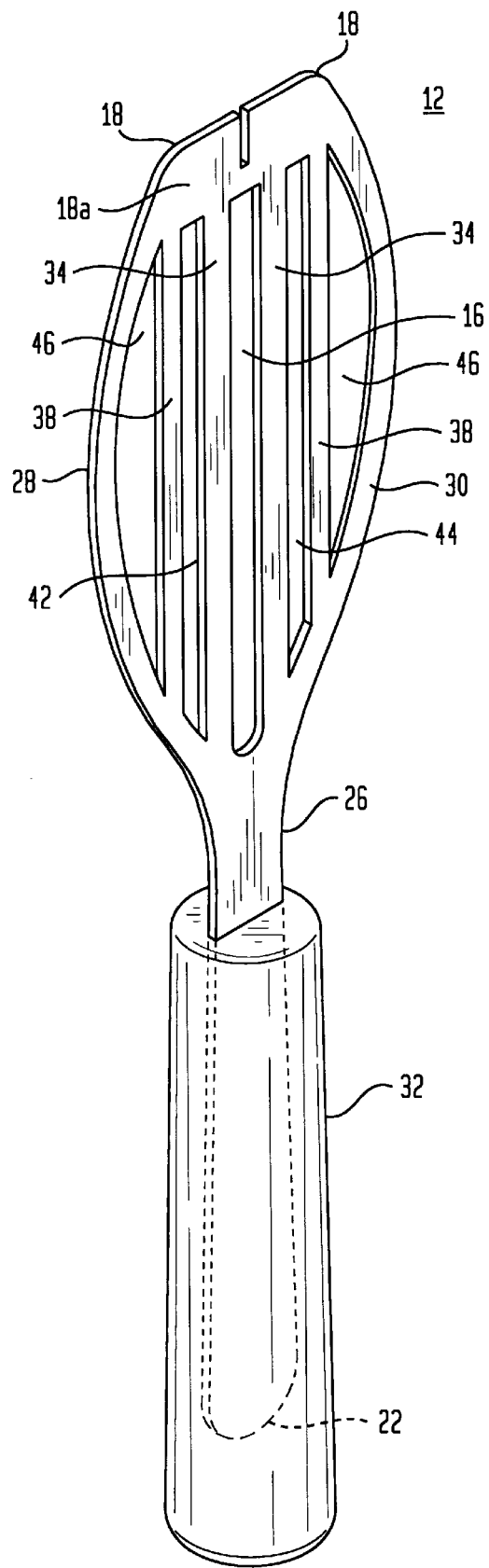
FIG. 1 is a perspective view of a preferred embodiment of the invention.

Referring now to FIGS. 1–5, the whisk employs a single member 12. This member is a flat, thin, somewhat flexible elongated element having a longitudinally extending centrally disposed axis of symmetry 16.

Member 12 has a lower end 18 and an upper end 22. The lower end is flat, relatively long and disposed at right angles to the axis of symmetry to define a horizontal extension 18—18. The extension lies in a horizontal plane disposed at right angles to the axis of symmetry.

The upper end 22 is relatively short and extends longitudinally from a common position 26 on the member located between said first and second ends.

The member has opposite sides 28 and 30 of like convex curvature which extend outwardly and downwardly from opposite ends of the horizontal extension to said common position.

The axis of symmetry forms a longitudinally extending centrally disposed slot 16 which extends between the extension and said common position.

A handle 32 engages and receives the upper end and extends to a position adjacent the common position.

The member has first and second like longitudinally extending bars, shown at 34 and disposed adjacent the slot 16. The member has third and fourth longitudinally extending bars shown at 38 which lie in the same common plane with corresponding bars 34 and are separated therefrom by corresponding vertical slots 42 and 44. Bars 34 are wider and hence stronger than bars 38.

Each pair of curved sides 28 are separated by corresponding slots 46 from corresponding bars 38. Sides 28 are narrower than bars 34 and have about the same strength as bars 38.

In use, the lower ends provide substantial area engagement of a sauce pan or the like as previously described and bars 34 are sufficiently strong to prevent bending or curving of the whisk. At the same time, bars 38 and the curved sides 28 are more flexible than bars 34 and permit easier engagement with curved walls of the pans.

As shown in FIG. 2, the lower end 18 has a flattened vertical region 18a. The disposed vertical slot 54 in region 18a has no function in this application and can be eliminated.

While the invention has been described with particular reference to the drawings and preferred embodiment, the protection solicited is to be limited only by the terms of the claims which follow.

What is claimed is:

1. A whisk comprising:

a flat, thin, somewhat flexible elongated member having a longitudinally extending centrally disposed axis of symmetry;

the member having first and second opposite ends;

the first and lower end of the member being flat, relatively long and disposed at right angles to the axis of symmetry to define a horizontal extension disposed in a horizontal plane at right angles to the axis of symmetry;

the second and upper end of the member being relatively short and extending longitudinally from a common position on the member which is located between said first and second ends;

the axis of symmetry being defined by a longitudinally extending centrally disposed slot which extends between the extension and said common position;

the member having opposite sides of like convex curvature which extend outwardly and downwardly from opposite ends of each horizontal extension to said common position;

the member having a first pair of longitudinal slots which are disposed symmetrically on opposite sides of the slot defining the axis of symmetry and a first pair of longitudinal bars, each one of the first pair of bars being disposed between the slot defining the axis of symmetry and a corresponding one of the first pair of longitudinal slots;

the member having a second pair of longitudinal slots, each slot in the second pair being disposed adjacent a corresponding one of said curved sides, and a second pair of longitudinal bars, each bar in the second pair being disposed between a corresponding one of the first pair of slots and a corresponding one of the second pair of slots.

2. The whisk of claim 1 wherein the second pair of bars and the corresponding sides are relatively more flexible than the first pair of bars.

3. The whisk of claim 2 further including handle means secured to the second end.

* * * * *